US007844177B2

(12) United States Patent
Winh et al.

(10) Patent No.: US 7,844,177 B2
(45) Date of Patent: Nov. 30, 2010

(54) OPTICAL SIGNAL CHANGEOVER DEVICE AND OPTICAL SIGNAL CHANGEOVER METHOD

(75) Inventors: Chanthan Winh, Yokohama (JP); Yukio Hayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 803 days.

(21) Appl. No.: 11/620,797

(22) Filed: Jan. 8, 2007

(65) Prior Publication Data

US 2007/0212066 A1    Sep. 13, 2007

(30) Foreign Application Priority Data

Mar. 8, 2006    (JP)    .............................. 2006-061993

(51) Int. Cl.
*H04J 14/00*    (2006.01)
(52) U.S. Cl. ............................... 398/7; 398/43; 398/45; 398/48
(58) Field of Classification Search ................... 398/56
See application file for complete search history.

(56) References Cited

U.S. PATENT DOCUMENTS

| | | | | |
|---|---|---|---|---|
| 4,878,215 | A * | 10/1989 | Rogers | 370/366 |
| 5,457,556 | A * | 10/1995 | Shiragaki | 398/50 |
| 6,424,445 | B1 * | 7/2002 | Tsushima et al. | 398/177 |
| 6,999,677 | B2 * | 2/2006 | Graves et al. | 398/5 |
| 7,088,919 | B2 * | 8/2006 | Graves | 398/50 |
| 7,130,540 | B2 * | 10/2006 | Simmons et al. | 398/49 |
| 7,212,739 | B2 * | 5/2007 | Graves et al. | 398/5 |
| 2003/0123785 | A1 * | 7/2003 | Sugitani et al. | 385/16 |
| 2003/0185566 | A1 * | 10/2003 | Nishi et al. | 398/56 |
| 2004/0184718 | A1 | 9/2004 | Kazama et al. | |

* cited by examiner

*Primary Examiner*—Ken N Vanderpuye
*Assistant Examiner*—Tanya Ngo
(74) *Attorney, Agent, or Firm*—Antonelli, Terry, Stout & Kraus, LLP.

(57) ABSTRACT

Disclosed herein are a device and a method for an optical signal changeover that will not necessitate any addition to the capacity of the optical signal selection unit even when the N×M optical switches are expanded in scale, but can keep the optical signal selection unit compact in size and enhance the reliability of the unit. The optical signals received from plural optical transmission lines are converted into predetermined wavelengths by the wavelength conversion unit based on the settings given from the system monitoring control unit. The converted optical signals are bifurcated by the optical bifurcating unit and inputted to the optical switches of the active system and the optical switches of the stand-by system. The optical signals outputted from the optical switches of the active system and from the optical switches of the stand-by system are wavelength-multiplexed by the wavelength multiplexer of the active system and the wavelength multiplexer of the stand-by system and inputted to the 2×1 optical switches of the optical signal selection unit. The optical signal selection unit selects either of the inputted optical signals of the active system or of the stand-by system in accordance with the settings given by the monitoring control unit. The selected wavelength-multiplexed optical signals are demultiplexed by the wavelength demultiplexer into multi-channel optical signals for outputting.

4 Claims, 8 Drawing Sheets

US 7,844,177 B2

OPTICAL SIGNAL CHANGEOVER DEVICE AND OPTICAL SIGNAL CHANGEOVER METHOD

BACKGROUND OF THE INVENTION

This invention relates to an optical signal changeover device and an optical signal changeover method and, in particular, to the optical signal changeover device and the optical signal changeover method that include a redundant configuration used in the multiple-wavelength optical transmission system The optical network is fast becoming popular as a means of communication network which allows high-speed and large-capacity data transmission. In the back of such popularization, there is the progress in the field of optical wavelength multiplexing technology. By adopting the optical wavelength multiplexing technology which enables a single line of optical fiber cable to transmit multiple optical signals with different wavelengths respectively, it has become possible to transmit in only one cable several to several thousand times more amount of information as compared to when wavelength multiplexing is not available.

The central core in the configuration of the optical network is the optical signal changeover device. The optical signal changeover device is a kind of node unit connecting a plurality of transmission paths. The device dissolves a plurality of multiple-wavelength optical signals coming in through a plurality of optical transmission paths, one from another by difference of wavelength, conducts changeover of paths so as for these optical signals to be outputted to designated paths in groups of wavelengths or destinations, and multiplex wavelengths of the optical signals again before outputting the signals to the optical transmission paths.

As mentioned above, the bigger the transmission volume of network grows, the more the need for expansion in terms of wide-band and capacity becomes acute in regard to optical transmission paths, node units (those optical signal changeover devices, repeaters, etc. which are installed at each node in the network); and at the same time, this would mean so much greater impact to be caused on the transmission service just in case any serious trouble should occur. Therefore, to ensure the reliability of service even at the time of occurrence of trouble, it has been being exercised that the optical signal changeover device is designed to have a dual configuration with an active system and a stand-by system (a redundant configuration). Such dualization or dual configuration is called as redundant or a redundant configuration.

A conventional optical transmission device with a redundant configuration is exemplified by the ones shown in US2003/0123785 and US2003/0185566. Explanation follows with respect to such an optical transmission device provided with a conventional redundant configuration.

In a conventional optical signal changeover device having a redundant configuration, optical signals inputted are first segmented into two groups by the optical bifurcating unit, viz., 1×2 optical couplers 12-1 to 12-N. The segmented input optical signals are sent to N×M optical switches for the active system and also to N×M optical switches for the stand-by system, and these N×M optical switches for the active system and the stand-by system respectively play the role of changing over the optical paths. The optical signals outputted from the N×M optical switches of the active system and the stand-by system are placed under monitoring as to the state of communication. Such monitoring of communication status helps detect occurrence of any failure. The control unit controls a plurality of 2×1 optical switches to carry out changeover and reinstatement between the optical signals of the active system and the optical signals of the stand-by system. The optical signals outputted from the 2×1 optical switches are sent out multiplexed with other optical signals which are also to be sent out to the same transmission path. The correspondence of respective 2×1 optical switches to the outputted optical signals Out1 to OutM and also to the transmission paths is made in a fixed manner.

As to the optical switches used in the optical signal changeover device, known are those micro-electromechanical systems (MEMS) as shown in US2004/0184718.

SUMMARY OF THE INVENTION

In a optical signal changeover device having a conventional redundant configuration, one 2×1 optical switch is required for every one output port for N×M optical switches as an optical signal selection unit covering N×M optical switches each for the active system and the stand-by system. In other words, M pieces of 2×1 optical switches are used therein. Therefore, an increased number of 2×1 optical switches will come to be required in proportion to the growing scale of the optical signal changeover device. The value M stands at several hundreds or even more than one thousand today.

It is not limited to the optical switches, but the numbers of the optical amplifiers and other related components that need to be installed additionally corresponding to the number of output ports for N×M optical switches would possibly reach the order of several hundreds to one thousand; all these resulting that the more the value M is expanded, the more the scale will be enlarged of the hardware of the optical signal selection unit accounting for the entire system. The cost will also run up, and reliability might make another matter.

The present invention aims at providing an optical signal changeover device and the optical signal changeover method that can keep the optical signal selection unit compact in size and maintain high reliability, even if the N×M optical switches are expanded in scale.

To address the above problem, one aspect of the present invention is so configured that the optical signals inputted to an optical signal changeover device is bifurcated for changeover of paths by the first and second optical switches; that the signals outputted from the respective optical switches are wavelength-multiplexed by the first and second wavelength multiplexers provided in the stage subsequent to the first and second optical switches; and that the optical signals are converted in wavelength by the wavelength converters provided at the stage preceding the optical bifurcating unit or at the stage subsequent to the first and second optical switches, so as to be inputted to the wavelength multiplexers. It is further configured that the first and second optical signals inputted to the first and second wavelength multiplexers and wavelength-multiplexed therein are placed under control of the monitoring controller so as to select either of the first or the second optical signal, and that such selected optical signal of multiple wavelengths is demultiplexed by the wavelength demultiplexer into the form of multi-channel optical signals to be outputted.

In this aspect, the necessary data for wavelength conversion of the inputted optical signals may be determined based on the path changeover information received from the network monitoring controller which monitors and controls the entire network, and the above data may be setup in the wavelength converter provided at the stage preceding the optical signal bifurcating unit.

BRIEF DESCRIPTION OF THE DRAWINGS

Embodiments of the present invention will be described in detail based on the following figures, wherein.

DETAILED DESCRIPTION OF THE PREFERRED EMBODIMENTS

Explanation is made below on three preferred embodiments in regard to the optical signal changeover device and the optical signal changeover method according to the present invention.

Figure 2:
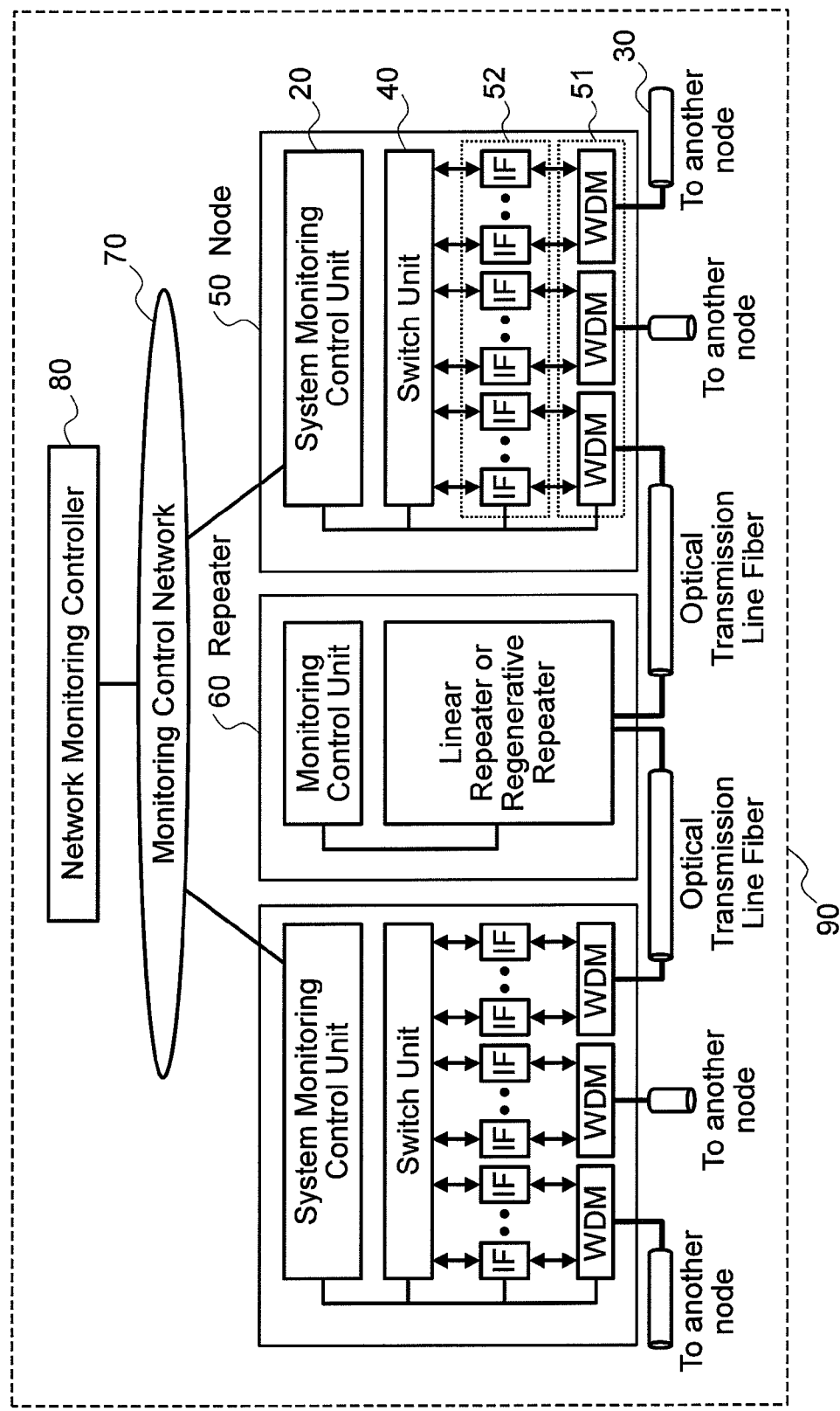
FIG. 2 is a block diagram showing a part of configuration of an optical network to which the present invention is applicable.

Before getting into explanation of the embodiments, some explanation is inserted here as to where the present invention is positioned in the optical network employing the optical signal changeover device and the changeover method of the present invention. FIG. 2 is a block diagram showing a part of configuration of an optical network to which the present invention is applied. The network may take the forms of mesh, ring, point-to-point, etc, but the present invention is not dependent on the form of the network. On the network, there is a plurality of nodes connecting transmission paths. Each node has a node unit 50 having the function of changing over paths for optical signals as well as a repeater 60 having the functions of reproducing and repeating the optical signals received but without a path changeover function. These nodes are connected to the network monitoring controller 80 through the monitoring control network 70. The network monitoring controller 80, through the monitoring control network 70, is capable of setting up the data for changeover of paths for optical signals in each node unit 50 and also collecting status data of each node.

In each node unit 50, a multiple-wavelength optical signal received through the optical transmission line 30 connecting to another node is demultiplexed by the wavelength division multiplexer 51 into multiple-channel optical signals and inputted to the switch unit 40 through the interface 52. The switch unit 40, controlled by the system monitoring control unit 20, conducts changeover of paths for inputted optical signals and outputs the signals to any one of the interface 52. The optical signal outputted through the interface 52 then undergoes wavelength multiplexing by means of the wavelength division multiplexer (WDM) 51 corresponding to each desired transmission line, and the wavelength-multiplexed signal is thus to be outputted.

Now, the present invention is going to be described below with reference to three preferred embodiments. In the below-mentioned embodiments, the portion of the node unit 50 composed of the switch unit 40 and the system monitoring control unit 20 is referred to as the optical signal changeover device, but the same portion also inclusive of the WDM 51 and the interface 52 may well be taken as the optical signal changeover device. At the same time, the multiplexer 51 and the interface 52 may well be deemed to have been omitted in the figures of the embodiments shown below.

Embodiment 1

Figure 1:
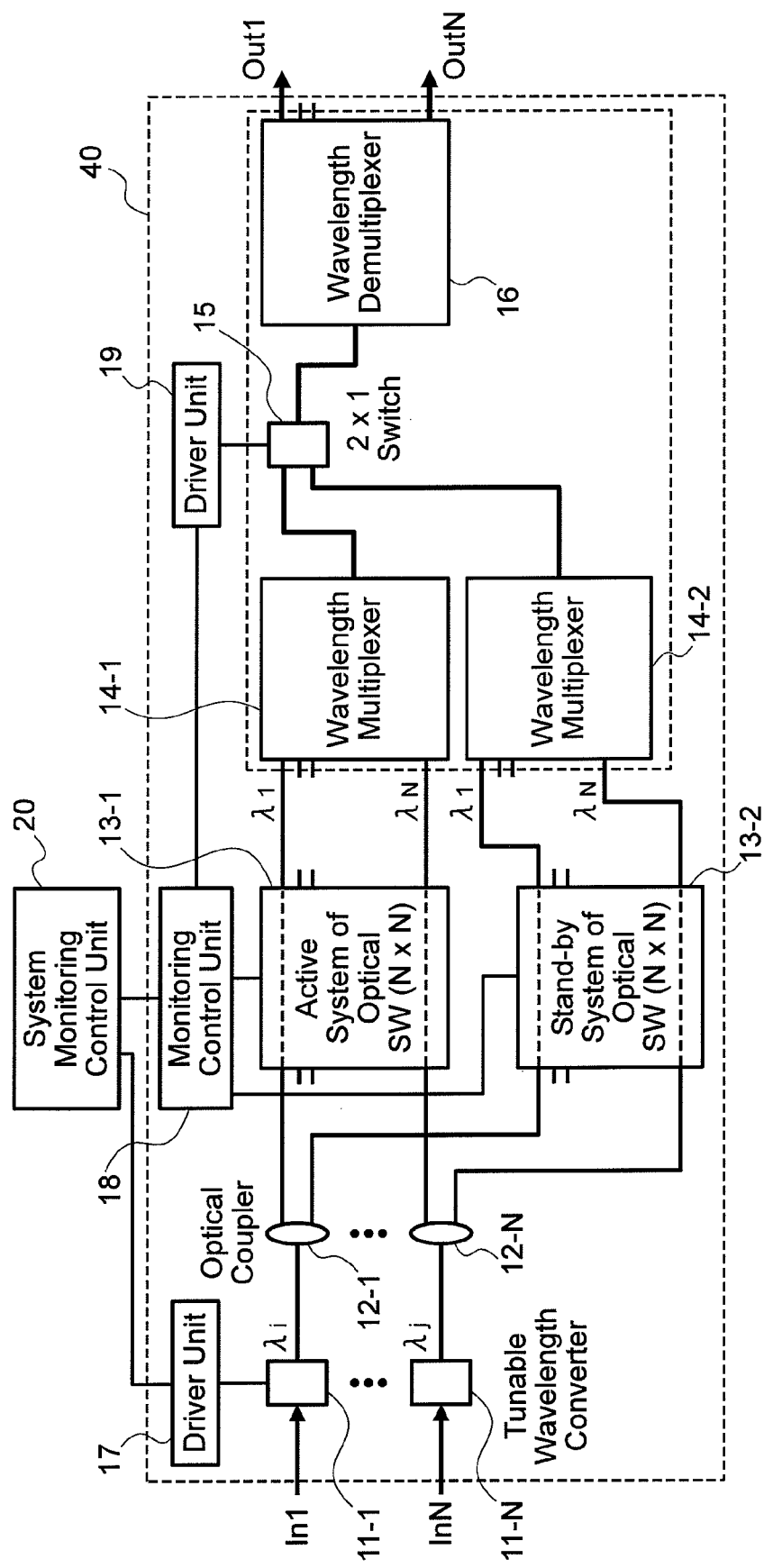
FIG. 1 is a block diagram illustrating the configuration of the optical signal changeover device according to the embodiment 1 of the present invention.
Figure 7:
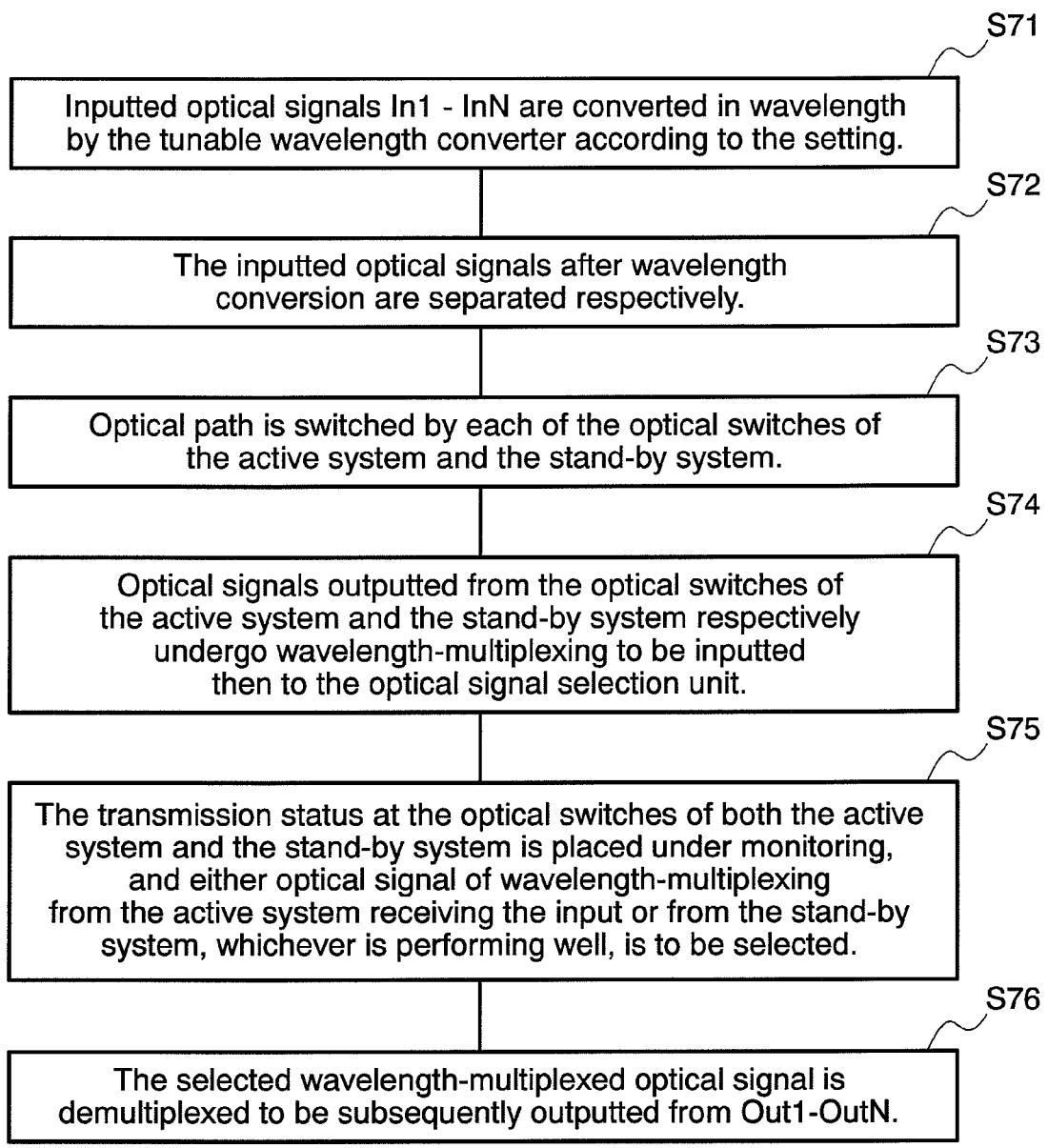
FIG. 7 is a flow chart outlining the optical signal changeover method according to the embodiment 1 of the present invention.

In the first place, the embodiment 1 is explained. FIG. 1 is a block diagram illustrating the configuration of the optical signal changeover device according to the embodiment 1 of the present invention. FIG. 7 is a flow chart outlining the optical signal changeover method according to the embodiment 1 of the present invention.

As shown in FIG. 1, the optical signal changeover device in the present embodiment 1 is configured with: (1) a plurality of wavelength converters 11-1 to 11-N to convert inputted optical signals into ones with desired wavelengths; (2) a plurality of 1×2 optical couplers 12-1 to 12-N to bifurcate inputted optical signals; (3) an optical path changeover unit to change over paths of inputted optical signals composed of the optical switches 13-1 for the active system and the optical switches 13-2 for the stand-by system; (4) wavelength multiplexers for the active system 14-1 to wavelength-multiplex the optical signals outputted from optical switches 13-1; (5) wavelength multiplexers for the stand-by system 14-2 to wavelength-multiplex the optical signals outputted from optical switches 13-2; (6) 2×1 optical switches 15 to select the optical signals either from the active system or from the stand-by system; (7) wavelength demultiplexers 16 to demultiplex each selected multiple-wavelength optical signal into multi-channel optical signals to be outputted; (8) the monitoring control unit 18 to perform monitoring the status of the path changeover unit and control of the optical signal selection unit 15; and (9) the system monitoring control unit 20 to perform monitoring and control of the entire system.

Incidentally, recommendable for the optical switches 13-1 and 13-2 used in the optical signal changeover device is the MEMS type optical switch, a large-capacity type optical switch, referred to in the above section of "BACKGROUND OF THE INVENTION." Also for the 2×1 optical switch 15 of the optical signal selection unit, a mechanical type optical switch, a waveguide type optical switch of SiO2 or LiNbO3 base, etc., are good for use. As for the wavelength division multiplexer, the PLC-AWG (Planer Light-wave Circuit-Arrayed-Waveguide Grating) type filter, which is already expanding its application into the field of optical wavelength multiplexing, is considered to be a suitable choice.

In the next place, explanation is made concerning the performance of the optical signal changeover device of the present embodiment. As shown in FIG. 1, the optical signal changeover device of the present embodiment has the configuration that the output ports of the optical switches 13-1 of the active system or of the optical switches 13-2 of the stand-by system are connected to the input ports of the wavelength multiplexer 14-1 of the active system or of the wavelength multiplexer 14-2 of the stand-by system. On the other hand, the optical wavelength that can be inputted to the input ports of the wavelength multiplexers 14-1 and 14-2 is pre-determined to be within a certain range. In accordance with such range of optical wavelength, wavelength conversion of the inputted optical signal needs to be conducted at the wavelength converter 11-1 to 11-N, and the wavelength-multiplexed optical signal outputted from the optical signal selection unit is to be demultiplexed into multi-channel optical signals by the wavelength demultiplexer 16 that has the same wavelength characteristic as the wavelength multiplexer 14-1 and 14-2. The demultiplexed optical signals are outputted respectively to the output ports of corresponding wavelengths. In the present embodiment, the following configuration has been adopted in view of the fact that each optical signal and each output port of the wavelength converters 11-1 to 11-N can be coordinated with each other in point of wavelength and that coordination with transmission lines, therefore, becomes possible. What wavelength each inputted optical signal is converted into is decided and performed under the control of the system monitoring control unit 20. The system monitoring control unit 20 receives information necessary for path changeover from the network monitoring control unit 80, shown in FIG. 2, which monitors and controls the entire network, and based on that information, the system monitoring control unit 20 determines the data of wavelength conversion for inputted optical signals and set it up in the wavelength converter 11-1 to 11-N. Such configuration enables each output port of the optical switches 13-1 and 13-2 to coordinate on one to one basis with each output port of the wavelength multiplexer 16, thereby making it possible to connect between transmission lines in any way as needed.

Explanation is made on the flow of optical signals in the optical signal changeover device of the present embodiment in reference to FIG. 1 and FIG. 7. The optical signals In1 to InN inputted to the optical signal changeover device from a plurality of optical transmission lines are converted in wavelength in accordance with the wavelength conversion data given from the system monitoring control unit and set up in the wavelength converters 11-1 to 11-N (S71). This wavelength conversion data has been set by the system monitoring control unit 20 in such a way that the optical signals inputted from a plurality of optical transmission lines are changed over in respect of paths to flow by the optical switches 13-1 for the active system or 13-2 for the stand-by system, and then sent to the wavelength multiplexer 14-1 for the active system and 14-2 for the stand-by system so as to be outputted to the output ports connecting to the transmission lines bound for destinations.

The inputted optical signals after wavelength conversion are bifurcated by a plurality of 1×2 optical couplers 12-1 to 12-N (S72), and are inputted to the optical switches 13-1 of the active system and 13-2 of the stand-by system for conversion of paths (S73). The optical signals outputted after path changeover from the optical switches of the active system 13-1 and the optical switches of the stand-by system 13-2 are put in the wavelength multiplexers 14-1 of the active system and 14-2 of the stand-by system so as to undergo wavelength multiplexing (S74). The wavelength-multiplexed optical signals of both the active system and the stand-by system are inputted to the 2×1 optical switches 15 or the optical signal selection unit (S74). The monitoring control unit 18 keeps the transmission status at the path changeover unit or both the optical switches 13-1 of the active system and 13-2 of the stand-by system under monitoring and exercises control over the optical signal selection unit or the 2×1 optical switch 15 so that either the optical signals of the active system now accepting input or the optical signals of the stand-by system, whichever is performing in normal state, may be selected (S75).

With such configuration, it becomes possible to realize high-speed changeover under the condition of redundant configuration.

Further, the monitoring control unit 18 always keeps on giving status information of the path changeover unit and the optical signal selection unit to the system monitoring control unit 20. In case both the optical switches of the active system and the stand-by system are performing in normal state, the optical signals of the active system are to be selected in preference to those of the stand-by system. The wavelength-multiplexed signal selected by the optical signal selection unit is demultiplexed by the wavelength demultiplexer 16 into multi-channel optical signals to be outputted (S76).

As described in the foregoing, the optical signal changeover device of the present embodiment is so configured that the output optical signals from the optical switches 13-1 of the active system and the optical switches 13-2 of the stand-by system under redundant configuration are wavelength-multiplexed by the wavelength multiplexer 14-1 of the active system and the wavelength multiplexer 14-2 of the stand-by system so as to be gathered together into one single optical fiber respectively. The optical signal selection unit is so configured that either the optical signals of the active system or the optical signals of the stand-by system may thus be selected. As a result, it is no longer necessary to use M pieces of the 2×1 optical switches to match with N×M switches as before, but now it is just enough to use one piece of the 2×1 optical switch 15 in order to hold all the optical signals as selectable.

Figure 3:
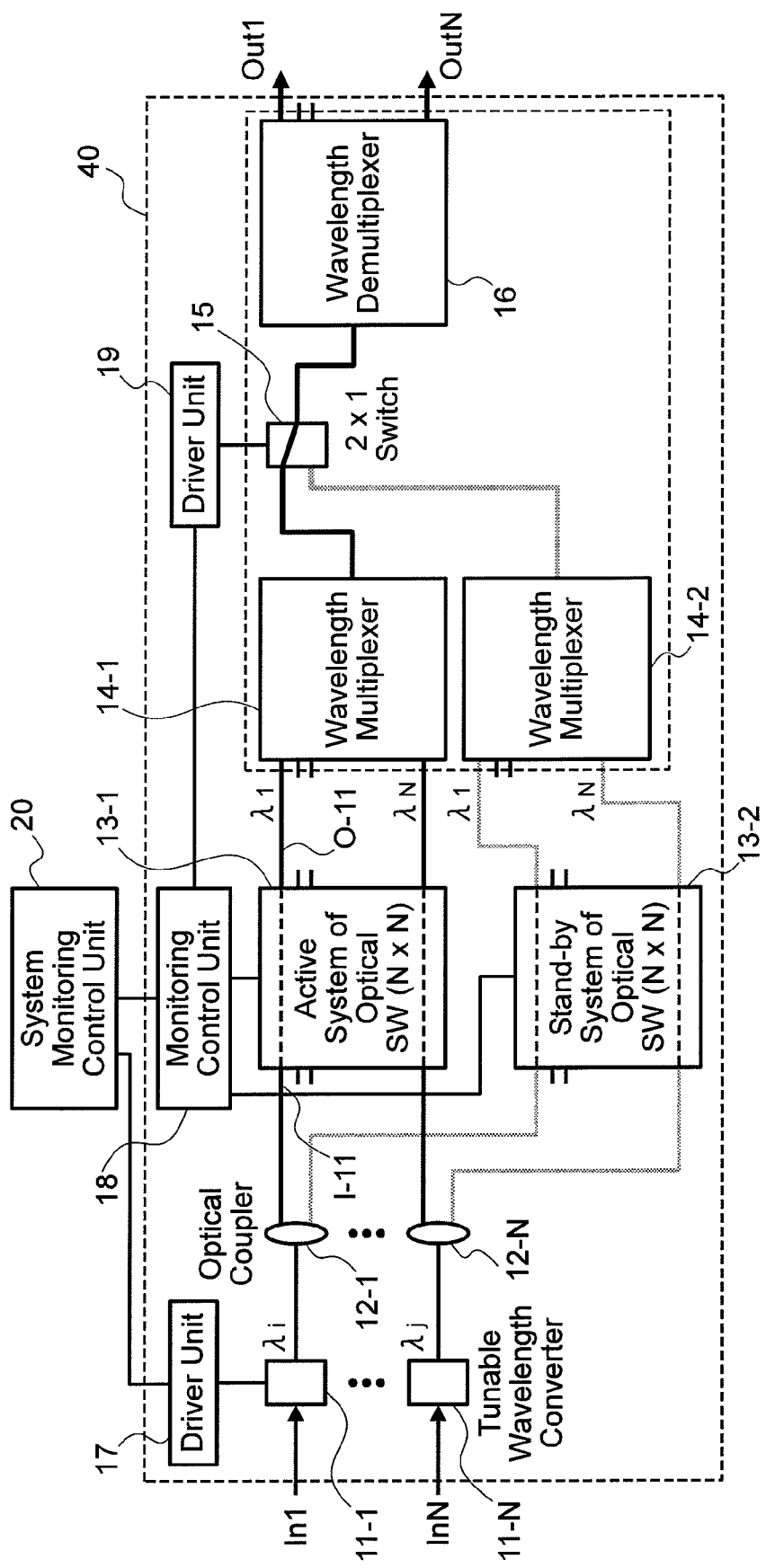
FIG. 3 is a block diagram of the optical signal changeover device according to the embodiment 1 of the present invention illustrating the performance when the device is in a normal state.

FIG. 3 is a block diagram of the optical signal changeover device according to the present embodiment 1 showing the performance when the device is in a normal operational state. The optical signal changeover device according to the present embodiment 1 has the monitoring control unit 18 conduct monitoring of communication status of the optical switches 13-1 of the active system and the optical switches 13-2 of the stand-by system. Based on such status information thus available, the monitoring control unit 18 directly controls the optical signal selection unit or the 2×1 optical switch 15 to make it select either the optical signals of the active system now accepting input or the optical signals of the stand-by system, whichever is in a normal operational state. Furthermore, the system monitoring control unit 20 is always kept supplied with the above status information.

Explanation is made concerning the flow of optical signals in case the optical signal changeover device is in a normal operational state. As mentioned above, based on the information from the system monitoring control unit 20 regarding path changeovers, the wavelength conversion data is set up in the respective wavelength converter 11-1 to 11-N to convert the wavelength of the received optical signals in accordance with such wavelength conversion data. The inputted optical signals after wavelength conversion are to be bifurcated by a plurality of the 1×2 optical couplers 12-1 to 12-N and are then to be inputted to the optical switch 13-1 of the active system and the optical switch 13-2 of the stand-by system. FIG. 3 shows an example where the input I-11 and the output O-11 are connected. The connectional relations between input and output are not limited to the above example, but they can be set any way as needed according to the connectional capability of the optical switches. The optical signals after path changeover outputted from the optical switches 13-1 of the active system and the optical switches 13-2 of the stand-by system are to be fed to the wavelength multiplexer 14-1 of the active system and the wavelength multiplexer 14-2 of the stand-by system for wavelength multiplexing, and then to be inputted to the optical signal selection unit 15. At this point, the optical signal changeover device being in normal state, the monitoring control unit 18 exercises control over the 2×1 optical switch 15 or the optical signal selection unit to make it select the optical signals of the active system. The wavelength-multiplexed optical signal of the active system thus selected is to be demultiplexed into multi-channel optical signals by the wavelength demutiplexer 16 and to be outputted.

Figure 4:
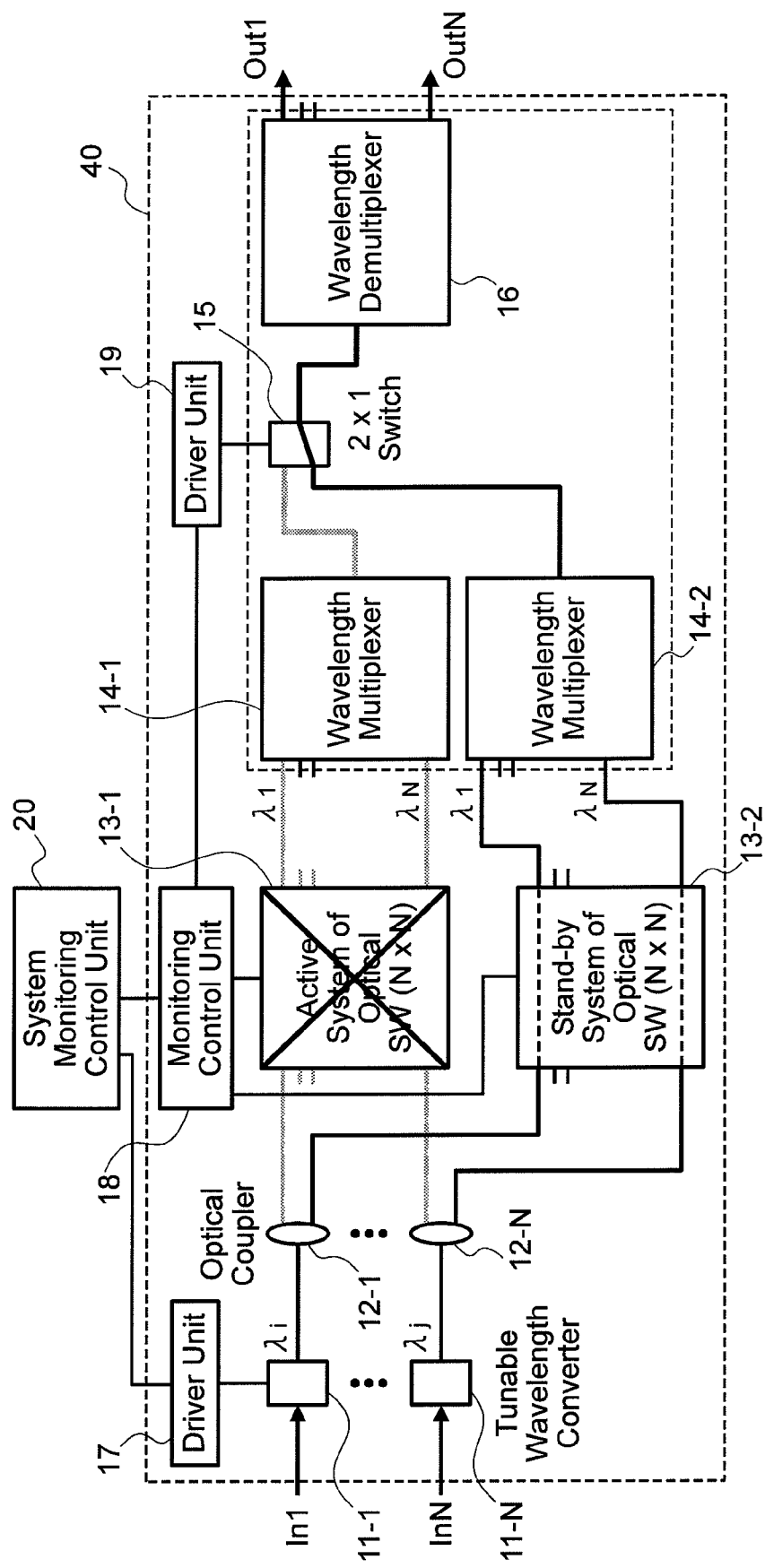
FIG. 4 is a block diagram of the optical signal changeover device according to the embodiment 1 of the present invention illustrating the performance when the device is in a state of failure having occurred.

FIG. 4 is a block diagram to explain about an example of a failure having occurred in the optical signal changeover device according to the present embodiment 1. FIG. 4 shows the case where a failure has taken place in the optical switch 13-1 of the active system. In the optical signal changeover device of the present embodiment, the status of communication at both of the optical switch 13-1 of the active system and the optical switch 13-2 of the stand-by system is placed under monitoring by the monitoring control unit. Assuming that there has occurred a failure to the optical switch 13-1 of the active system, this will be detected by the monitoring control unit 18. The monitoring control unit 18 will confirm if the optical switch 13-2 of the stand-by system is operating in a normal status or not, and if affirmative, the monitoring control unit 18 will control the optical signal selection unit or the 2×1 optical switch 15 to make it change over to the optical signals of the stand-by system for restoring the communication lines.

According to the optical signal changeover device of the present embodiment, any expansion in scale of the optical switches of the active system and the optical switches of the stand-by system will not necessitate to increase the scale of the 2×1 optical switch, permitting downsizing of the optical signal selection unit. To give a concrete example, a conventional redundant configuration using 100×100 large-capacity optical switches needed 100 sets of 2×1 optical switches as an optical signal selection unit in the past. In contrast to the foregoing, the optical signal changeover device of the present embodiment can be accomplished by the configuration of the wavelength converters, the wavelength multiplexer for the active system, the wavelength multiplexer for the stand-by system, one set of 2×1 optical switch, and the wavelength demultiplexer. Also, the 2×1 optical switch is an optical component with moving parts. The conventional configuration uses a very large number of 2×1 optical switches, that is, an optical component with moving parts. On the contrary, the present invention can be configured with such constituent components that have no moving part inside, except for only one set of optical component, namely, 2×1 optical switch which uses some moving parts. An optical part that has no moving part is superior in stability and reliability to one that has moving parts. Therefore, if an optical signal changeover device is configured in the way as the present invention is, it is certainly possible to realize an optical signal changeover device of higher reliability.

Embodiment 2

Figure 5:
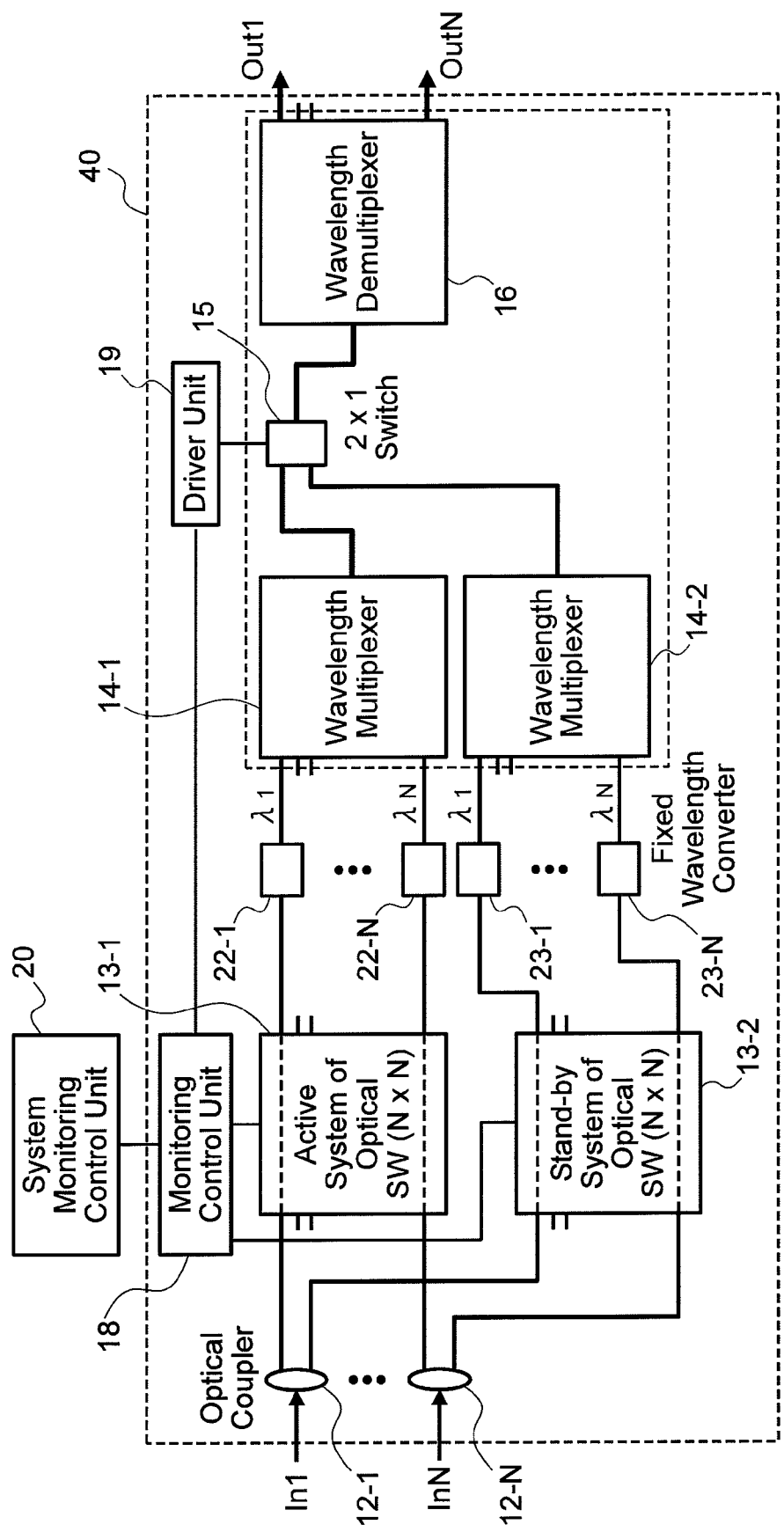
FIG. 5 is a block diagram illustrating the configuration of the optical signal changeover device according to the embodiment 2 of the present invention.
Figure 8:
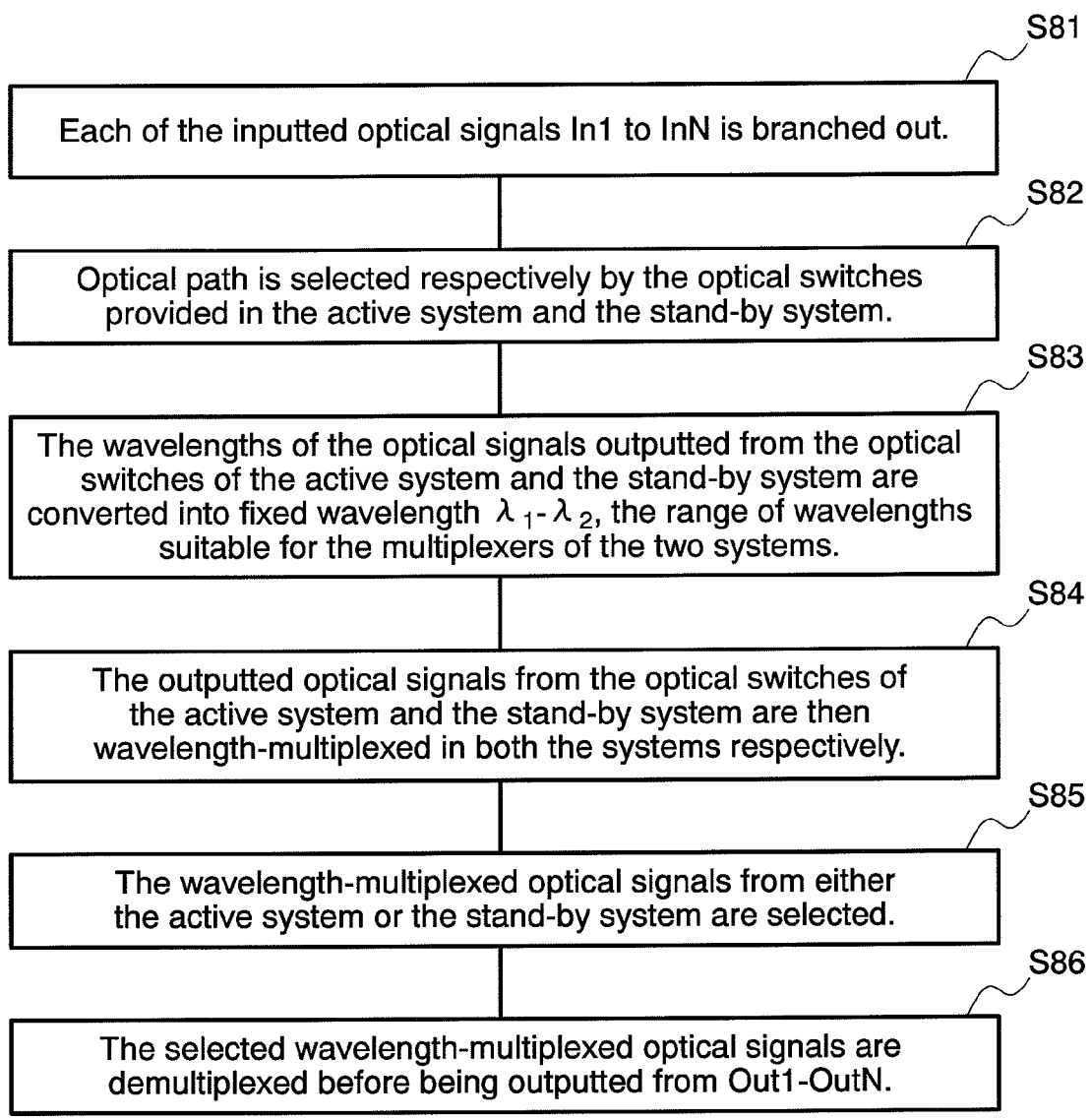
FIG. 8 is a flow chart outlining the optical signal changeover method according to the embodiment 2 of the present invention.

In the next place, explanation is made concerning the embodiment 2. FIG. 5 is a block diagram showing the configuration of the optical signal changeover device according to the embodiment 2 of the present invention. FIG. 8 is a flow chart outlining the optical signal changeover method according to the embodiment 2 of the present invention. The optical signal changeover device shown in FIG. 5 is configured with: (1) a plurality of 1×2 optical couplers 12-1 to 12-N to bifurcate the optical signals received from a plurality of optical transmission lines; (2) the optical switches 13-1 for the active system and the optical switches 13-2 of the stand-by system, or the path changeover unit, to change over the paths for the inputted optical signals to follow; (3) the wavelength conversion units 22-1 to 22-N and 23-1 to 23-N to convert the optical signals outputted from the optical switch 13-1 of the active system and the optical switch 13-2 of the stand-by system into pre-determined wavelengths; (4) the wavelength multiplexer 14-1 of the active system to wavelength-multiplex the optical signals after wavelength conversion and outputted from the optical switch 13-1 of the active system, and the wavelength multiplexer 14-2 of the stand-by system to wavelength-multiplex the optical signals after wavelength conversion and outputted from the optical switch 13-2 of the stand-by system; (5) the 2×1 optical switch 15 to select either the optical signals of the active system or the optical signals of the stand-by system; (6) the wavelength demultiplexer 16 to demultiplex the selected wavelength-multiplexed optical signal into multi-channel optical signals to be outputted; (7) the monitoring control unit 18 to monitor the operational status in the path changeover unit and to control the optical signal selection unit 15; and (8) the system monitoring control unit 20 to exercise monitoring and control over the entire system.

Explanation is made below concerning the flow of optical signals. The optical signals inputted from a plurality of optical transmission lines are bifurcated by a plurality of 1×2 optical couplers 12-1 to 12-N (S81), and inputted to the optical switch 13-1 of the active system and the optical switch 13-2 of the stand-by system for changeover of paths (S82). The optical wavelength that can be inputted to the wavelength multiplexers 14-1 for the active system and 14-2 for the stand-by system is pre-determined to be within a certain range. For this reason, the optical signals outputted from the optical switch of the active system and the optical switch of the stand-by system are converted by the wavelength conversion units 22-1 to 22-N and 23-1 to 23-N into those with the wavelength suitable for the wavelength multiplexer 14-1 for the active system and the wavelength multiplexer 14-2 for the stand-by system both in the subsequent stage (S83). After conversion of wavelength, the optical signals of the active system and the optical signals of the stand-by system are inputted to the wavelength multiplexer 14-1 of the active system and the wavelength multiplexer 14-2 of the stand-by system for wavelength multiplexing (S84). The wavelength-multiplexed optical signals are inputted to the 2×1 optical switch 15. The optical signal selection unit is to select either the optical signals of the active system or the optical signals of the stand-by system in accordance with the setting made by the monitoring control unit 18 (S85). The selected wavelength-multiplexed optical signal is then demultiplexed into multi-channel optical signals by the wavelength demultiplexer 16 and outputted (S86).

This optical signal changeover device of the present embodiment 2 is provided with the fixed wavelength converter 22-1 to 22-N and 23-1 to 23-N disposed between the optical switch 13-1 of the active system or the optical switch 13-2 of the stand-by system and the wavelength multiplexer 14-1 of the active system or the wavelength multiplexer 14-2 of the stand-by system. With this setup, settings for wavelength conversion by the system monitoring control unit 20 can now be dispensed with and also the control of the system can be simplified as compared to the embodiment 1.

Embodiment 3

Figure 6:
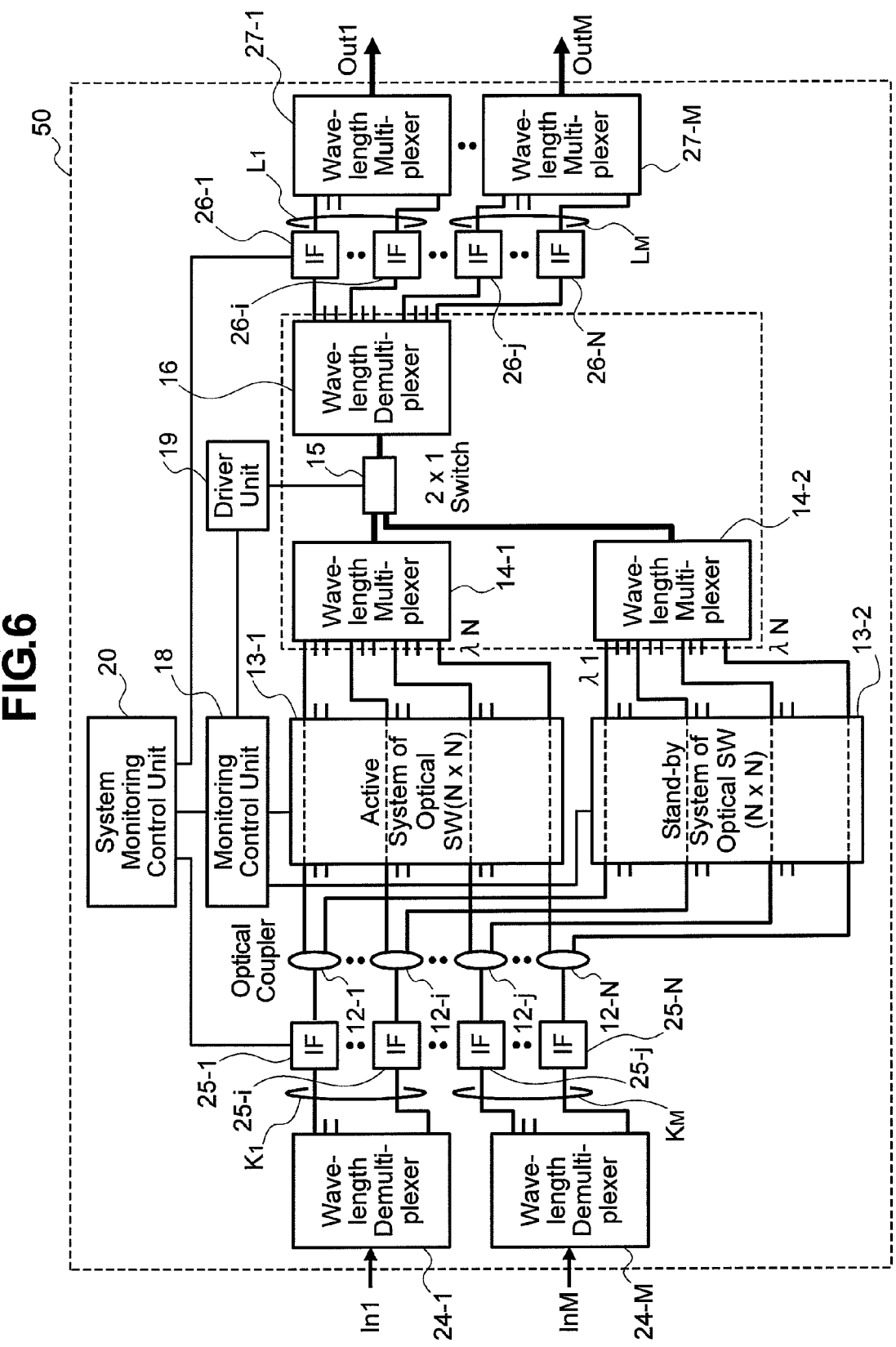
FIG. 6 is a block diagram illustrating the configuration of the optical signal changeover device according to the embodiment 3 of the present invention.

In the next place, explanation is given to the embodiment 3 of the present invention. FIG. 6 is a block diagram showing the configuration of the optical signal changeover device according to the embodiment 3 of the present invention. The optical signal changeover device 50 is configured with: (1)

the wavelength demultiplexers 24-1 to 24-M to demultiplex the inputted wavelength-multiplexed optical signal into multi-channel optical signals; (2) a plurality of the interface with the wavelength conversion function 25-1 to 25-*i* and 25-*j* to 25-N to convert inputted optical signals into those of any wavelength as needed; (3) a plurality of the optical couplers 12-1 to 12-*i* and 12-*j* to 12-N to bifurcate the inputted optical signals; (4) the path changeover unit composed of the optical switches 13-1 of the active system and the optical switch 13-2 of the stand-by system to change over paths for inputted optical signals; (5) the wavelength multiplexer 14-1 of the active system to wavelength-multiplex the optical signals outputted from the optical switches 13-1 of the active system; (6) the wavelength multiplexer 14-2 of the stand-by system to wavelength-multiplex the optical signals outputted from the optical switches 13-2 of the stand-by system; (7) the optical signal selection unit, namely the 2×1 optical switch 15, to select either the optical signals of the active system or those of the stand-by system; (8) the wavelength demultiplexer 16 to demultiplex the selected wavelength-multiplexed optical signals into multi-channel optical signals; (9) the monitoring control unit 18 to exercise monitoring of the performance of the path changeover unit and control of the optical signal selection unit 15; (10) a plurality of interface 26-1 to 26-*i* and 26-*j* to 26N to take the optical signals demultiplexed at the wavelength demultiplexer 16 to the optical transmission lines; (11) the wavelength multiplexers 27-1 to 27-M to wavelength-multiplex, and to subsequently output, the optical signals coming through the interface 26-1 to 26-*i* and 26-*j* to 26N; and (12) the system monitoring control unit 20 to perform monitoring and control of the entire system.

Incidentally, quotable as examples of the interface 25-1 to 25-*i*, 25-*j* to 25-N, 26-1 to 26-*i*, and 26-*j* to 26-N are the optical signals having a speed over STM-0 (51.84 MHz) as specified in the ITU-T Recommendation, 10GbE as standardized by IEEE 802.3ae or so-called GbE, etc. O/E conversion is made of these optical signals converting them into electrical signals, and then, following overhead processing, E/O conversion is again made turning the signals back to optical signals.

The flow of the optical signals is explained below. The wavelength-multiplexed optical signals received from the optical transmission lines are demultiplexed by the wavelength multiplexers 24-1 to 24-M into multi-channel optical signals to be inputted to the subsequent stage. As explained in the case of the embodiment 1, the output ports of the optical switches 13-1 of the active system or of the optical switches 13-2 of the stand-by system are connected to the input ports of the wavelength multiplexer 14-1 of the active system or of the wavelength multiplexer 14-2 of the stand-by system. On the other hand, the optical wavelength that can be inputted to the input ports of the wavelength multiplexers 14-1 and 14-2 is pre-determined to be within a certain range. With attention paid on that point and in accordance with such range of optical wavelength, wavelength conversion of the inputted optical signals are conducted at the interface with the function of the wavelength conversion 25-1 to 25-*i* and 25-*j* to 25-N, and the wavelength-multiplexed optical signals outputted from the optical signal selection unit are demultiplexed into multi-channel optical signals by the wavelength demultiplexer 16 that has the same wavelength characteristic as the wavelength multiplexer 14-1 and 14-2.

The configuration set in the way mentioned above enables each output port of the optical switches 13-1 and 13-2 to coordinate on one to one basis with each output port of the wavelength multiplexer 16, thereby making it possible to connect between transmission lines in any way as needed. Assuming the number of output ports for any given wavelength demultiplexer 24-*i* is "Ki" (i=1, . . . , M) and the number of the interface 25-1 to 25-N is "A," A is expressed as follows.

$$A = \Sigma i K i (i:1, \ldots, M) \qquad \text{Formula 1}$$

The wavelength-converted and inputted optical signals are bifurcated by a plurality of 1×2 optical couplers 12-1 to 12-*i* and 12-*j* to 12-N so as to be inputted to the optical switch 13-1 of the active system and the optical switches 13-2 of the stand-by system. The optical signals after path changeover and outputted from the optical switches 13-1 of the active system and the optical switches 13-2 of the stand-by system are fed to the wavelength multiplexer 14-1 of the active system and the wavelength multiplexer 14-2 of the stand-by system for wavelength multiplexing. The wavelength-multiplexed optical signals of both the active system and the stand-by system are made input to the optical signal selection unit or the 2×1 optical switch 15. The optical signal selection unit selects either the inputted optical signals of the active system or the inputted optical signals of the stand-by system in accordance with the settings done by the monitoring control unit 18. The selected wavelength-multiplexed optical signals are demultiplexed by the wavelength demultiplexer 16 into multi-channel optical signals, which are then outputted to the interface 26-1 to 26-*i* and 26-*j* to 26-N. The optical signals through the interface 26-1 to 26-*i* and 26-*j* to 26-N. are wavelength-multiplexed by the wavelength multiplexers 27-1 to 27-M before outputting. Additionally, assuming the number of input ports of any given wavelength multiplexer 27-*i* is "Li" (i=1, . . . , M) and the number of the interface 26-1 to 26-N is "B," B is expressed as follows.

$$B = \Sigma i L i (i:1, \ldots, M) \qquad \text{Formula 2}$$

According to the optical signal changeover device and the optical signal changeover method of the present embodiment, any expansion in scale of the N×M optical switches will not necessitate any addition to the capacity of the optical signal selection unit, thereby permitting downsizing of the optical signal selection unit as well as providing an optical signal changeover device and an optical signal changeover method which are highly reliable and capable of carrying out high-speed changeover.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical signal changeover device which has a plurality of input ports and a plurality of output ports, and performing path changeovers of optical signals received at the input ports and outputted from the output ports, the optical signal changeover device comprising a plurality of optical bifurcating units to bifurcate a plurality of optical signals respectively and to send bifurcated optical signals to first and second optical switches;

a path changeover unit provided with the first and second optical switches, to change over the paths of the optical signals sent from the optical bifurcating units;

a plurality of fixed wavelength conversion units to perform conversion to a predetermined fixed wavelength for each of optical signals outputted from the first and second optical switches, first and second wavelength multiplexers provided corresponding to the first and second optical switches, respectively, to perform wavelength-multiplexing of the optical signals outputted from the fixed wavelength conversion units, an optical signal selection unit to select the optical signals outputted either from the first wavelength multiplexer or from the second wavelength multiplexer;

a wavelength demultiplexer to demultiplex the wavelength-multiplexed optical signals selected by the optical signal selection unit and to output optical signals after demultiplexing;

a monitoring control unit to exercise monitoring of the status at the path changeover unit and to control operation of the optical signal selection unit; and a system monitoring control unit to exercise monitoring and control over the entire system wherein the monitoring control unit controls the optical signal selection unit to select either the optical signals outputted from the first wavelength multiplexer or the optical signals outputted from the second wavelength multiplexer based on the status at the path changeover unit.

2. An optical signal changeover method of changing over paths of optical signals inputted, via input ports and outputted, via output ports, the optical signal changeover method comprising:

bifurcating the optical signals respectively to send out bifurcated optical signals to a first optical switch and a second optical switch;

performing a path changeover of the optical signals at the first and second optical switches;

converting each of the optical signals outputted from the first and second optical switches into a predetermined wavelength, via a fixed wavelength conversion unit;

wavelength-multiplexing each optical signal outputted from the fixed wavelength conversion unit following every optical signal outputted from the first and second optical switches, via a first wavelength multiplexer and a second wavelength multiplexer which are configured to correspond to the first and second optical switches, respectively;

selecting the optical signals after wavelength multiplexing outputted from either the first wavelength multiplexer or from the second wavelength multiplexer; and demultiplexing selected wavelength-multiplexed optical signals for output, wherein a status at the path changeover is monitored and selecting the optical signals are controlled such that either the optical signals outputted from the first wavelength multiplexer or the optical signals outputted from the second wavelength multiplexer are selected for demultiplexing based on a status at the path changeover.

3. The optical signal changeover device according to claim 1, wherein the first optical switch is in an active state and the second optical switch is in a stand-by state, and wherein the monitoring control unit controls the optical signal selection unit to select optical signals in a normal state from either the optical signals outputted from the first wavelength multiplexer or the optical signals outputted from the second wavelength multiplexer.

4. The optical signal changeover method according to claim 2, wherein the first optical switch is in an active state and the second optical switch is in a stand-by state, and wherein the optical signals are selected in a normal state from either the optical signals outputted from the first wavelength multiplexer or the optical signals outputted from the second wavelength multiplexer.

* * * * *